(12) United States Patent
Fesl et al.

(10) Patent No.: US 10,590,862 B2
(45) Date of Patent: Mar. 17, 2020

(54) INTERNAL COMBUSTION ENGINE, IN PARTICULAR AS DRIVE ENGINE FOR A VEHICLE

(71) Applicant: MAN Truck & Bus AG, München (DE)

(72) Inventors: Manfred Fesl, Nürnberg (DE); Sebastian Reichert, Emskirchen (DE)

(73) Assignee: MAN TRUCK & BUS AG, München (DE)

( * ) Notice: Subject to any disclaimer, the term of this patent is extended or adjusted under 35 U.S.C. 154(b) by 0 days.

(21) Appl. No.: 16/016,223

(22) Filed: Jun. 22, 2018

(65) Prior Publication Data
US 2019/0017447 A1 Jan. 17, 2019

(30) Foreign Application Priority Data
Jul. 12, 2017 (DE) .......................... 10 2017 115 599

(51) Int. Cl.
*F01N 11/00* (2006.01)
*F02D 9/06* (2006.01)
(Continued)

(52) U.S. Cl.
CPC .................. *F02D 9/06* (2013.01); *F01N 9/00* (2013.01); *F01N 13/008* (2013.01);
(Continued)

(58) Field of Classification Search
CPC ............. F01N 2240/36; F01N 2560/02; F01N 2900/1406; G01L 15/00; G01L 23/24
See application file for complete search history.

(56) References Cited

U.S. PATENT DOCUMENTS

| 6,422,088 B1 * | 7/2002 | Oba ......................... G01D 3/08 |
| | | 73/754 |
| 2008/0196395 A1 | 8/2008 | Hashizume |

FOREIGN PATENT DOCUMENTS

| AT | 413857 B | 6/2006 |
| DE | 60028678 T2 | 5/2007 |

(Continued)

OTHER PUBLICATIONS

Machine translation of DE 102012218214 A1, accessed Aug. 14, 2019. (Year: 2019).*

(Continued)

*Primary Examiner* — Jonathan R Matthias
(74) *Attorney, Agent, or Firm* — Weber Rosselli & Cannon LLP (57) ABSTRACT

An internal combustion engine, as a drive engine for a vehicle, including an engine braking device having a throttle element which is associated with an exhaust gas section, for damming an exhaust gas which is emitted by a combustion device, and including a measuring device by means of which the exhaust gas pressure can be measured at a defined measuring region of the exhaust gas section upstream of the throttle element as seen in the exhaust gas flow direction. According to the disclosure, it is provided that at least one further measuring device is provided, by means of which the exhaust gas pressure can be measured at the defined measuring region, for realizing a redundant exhaust gas pressure measurement, and the measurement signals which are determined by means of the measuring devices can be transmitted to a controller for controlling the throttle element.

20 Claims, 4 Drawing Sheets

(51) Int. Cl.
*F02D 35/00* (2006.01)
*F01N 13/00* (2010.01)
*F01N 9/00* (2006.01)

(52) U.S. Cl.
CPC ...... *F02D 35/0015* (2013.01); *F01N 2240/36* (2013.01); *F01N 2560/08* (2013.01); *F01N 2560/14* (2013.01); *F01N 2590/08* (2013.01); *F01N 2900/1406* (2013.01); *F02D 2250/34* (2013.01); *F02D 2400/18* (2013.01)

(56) References Cited

FOREIGN PATENT DOCUMENTS

| | | |
|---|---|---|
| DE | 102008050252 A1 | 4/2010 |
| DE | 102012218214 A1 | 4/2014 |
| DE | 102013003328 A1 | 8/2014 |
| DE | 102013204797 A1 | 9/2014 |
| DE | 102014219926 A1 | 4/2015 |
| DE | 102013226138 A1 | 6/2015 |
| EP | 1724458 A1 | 11/2006 |
| EP | 2320040 A1 | 5/2011 |
| EP | 2772741 A2 | 9/2014 |
| EP | 3034843 A1 | 6/2016 |
| EP | 3034844 A1 | 6/2016 |

OTHER PUBLICATIONS

Machine translation of DE 102013003328 A1, accessed Aug. 14, 2019. (Year: 2019).*
Machine translation of DE 102008050252 A1, accessed Aug. 14, 2019. (Year: 2019).*
European Office Action issued in corresponding EP Application No. 18178950.4 dated Oct. 24, 2019, 4 pages. No English Translation available.

* cited by examiner

INTERNAL COMBUSTION ENGINE, IN PARTICULAR AS DRIVE ENGINE FOR A VEHICLE

BACKGROUND

The disclosure relates to an internal combustion engine, in particular as a drive engine for a vehicle.

It is generally known to provide an engine braking device, in particular an engine backpressure brake, on an internal combustion engine as a drive engine of a vehicle, in which engine braking device an exhaust gas flowing through an exhaust gas section is dammed by means of a throttle element, which is associated with the exhaust gas section, for the purpose of braking the engine and therefore also for the purpose of braking the vehicle. A pressure sensor for measuring the exhaust gas pressure, which pressure sensor is connected for signaling purposes to a controller for controlling an actuating motor by means of which the throttle element can be moved and/or pivoted and therefore the throttling effect can be adjusted, is in this case usually arranged upstream of the throttle element as seen in the exhaust gas flow direction in a defined region of proximity in the region of the throttle element for the purpose of adjusting the engine braking effect. In this case, the optimum position of the throttle element is determined by means of the controller depending on the exhaust gas pressure which is measured by means of the pressure sensor, and the actuating motor is actuated for the purpose of pivoting or moving the throttle element to this optimum throttle position.

EP 3 034 844 A1 discloses, for example, an engine braking apparatus for an internal combustion engine in motor vehicles, in which the internal combustion engine has an intake system, an exhaust gas system, internal combustion engine-side gas exchange valves, an exhaust gas turbocharging arrangement and also an engine braking device. This engine braking device comprises a compression release brake, which influences at least one outlet valve of the gas exchange valves, and also a brake flap which is arranged in the exhaust gas system and dams the exhaust gas. In this case, a pressure sensor for measuring the exhaust gas pressure, which pressure sensor is connected for signaling purposes to an engine controller of the internal combustion engine, is arranged upstream of the brake flap as seen in the exhaust gas flow direction here. The brake flap or an actuator device for adjusting the brake flap position can be controlled by means of this engine controller.

However, problems arise if the measurement signal of the pressure sensor which is transmitted to the controller is faulty or does not correspond to the actual exhaust gas pressure. This may lead to unintentional or incorrect adjustment of the throttle element, and this may lead, for example, to undesired acceleration of the internal combustion engine and therefore also of a vehicle which comprises the internal combustion engine as drive engine.

SUMMARY

One object of the disclosure is therefore to provide an internal combustion engine, in particular as a drive engine for a vehicle, and also a method for operating an internal combustion engine, in which internal combustion engine and method the engine braking effect is adjusted as desired with a greater degree of reliability.

One aspect of the present disclosure proposes an internal combustion engine, in particular as a drive engine for a vehicle, comprising an engine braking device, wherein the engine braking device has a throttle element which is associated with an exhaust gas section, in particular a throttle valve, for damming an exhaust gas which is emitted by a combustion device, and comprising a measuring device by means of which the exhaust gas pressure can be measured at a defined measuring region of the exhaust gas section upstream of the throttle element as seen in the exhaust gas flow direction. According to the disclosure, at least one further measuring device is provided, by means of which the exhaust gas pressure can likewise be measured at the defined measuring region, in particular for realizing a redundant exhaust gas pressure measurement. In addition, the measurement signals which are determined by means of the measuring devices can be transmitted to a controller, in particular to a controller for controlling the throttle element.

In this way, the engine braking effect is adjusted as desired with an increased degree of reliability since the exhaust gas pressure is now measured several times at the defined measuring region and the determined plurality of measurement signals are then transmitted to the controller. The controller can compare the transmitted measurement signals and in this way carry out a plausibility check. If the controller determines a faulty pressure measurement in the case of an excessive deviation of the measurement signals from one another, the controller can move the throttle element, for example, to a basic position in which the throttle element does not have a damming effect or only a very slight damming effect. Therefore, a redundant exhaust gas pressure movement is realized in a simple and effective manner by means of the plurality of measuring devices.

In one embodiment of the internal combustion engine according to the disclosure, a connecting line branches off from an exhaust gas line of the exhaust gas section at the defined measuring region, an interior chamber of the exhaust gas line being connected in a pressure-transmitting manner by means of the said connecting line to a pressure chamber of the pressure-determining device which comprises the measuring devices, in particular in such a way that substantially only the hydrostatic exhaust gas pressure or the exhaust gas backpressure acts in the pressure chamber. In this way, the current exhaust gas pressure can be measured at the defined measurement region of the exhaust gas section by means of the plurality of measuring devices in a simple and effective manner.

In another embodiment, the connecting line protrudes substantially at a right angle from the exhaust gas line. Further preferably, the connecting line has a 90° flow deflection in order to realize simple and effective construction. For particularly simple construction, the connecting line is formed by a substantially L-shaped pipe section. As an alternative, the connecting line could also be formed by a temperature-resistant hose.

In an embodiment, a pressure-detecting device which comprises the measuring device has, for the pressure measurement, at least one deformation element, in particular a diaphragm element and/or a pressure cell, which delimits and/or forms a pressure chamber of the pressure-detecting device on the outside and is deformed in a pressure-dependent manner, wherein each measuring device has an electrical measuring circuit which is mounted onto a deformation element. In this way, the exhaust gas pressure can be redundantly measured in a simple and effective manner. The deformation element or at least one deformation region of the deformation element can be produced, for example, from a ceramic material in this case.

The respective electrical measuring circuit can be formed, for example, by a resistive electrical circuit. In this way, a piezo-resistive measurement principle can be realized for the pressure measurement, in which the electrical resistance of the circuit is changed in a measurable manner in the event of a deformation of the deformation element. As an alternative, the respective electrical measuring circuit can also be formed by a capacitive electrical circuit. Here, the electrical capacitance of the circuit changes in a measurable manner in the event of a deformation of the deformation element.

In a further embodiment, the pressure-detecting device has a single deformation element, wherein an electrical measuring circuit of a first measuring device is mounted on a subregion of this deformation element, and wherein an electrical measuring circuit of a second measuring device is mounted on a further subregion of the deformation element. Therefore, the pressure-detecting device can be designed in a particularly compact manner.

As an alternative, the pressure-detecting device can also have a plurality of, in particular two, deformation elements, wherein an electrical measuring circuit of a first measuring device is mounted onto a first deformation element, and wherein an electrical measuring circuit of a second measuring device is mounted onto a second deformation element. In this way, the pressure-detecting device can be realized with a simplified construction.

In a further embodiment, a signal-determining circuit is associated with each measuring circuit, it being possible to determine a measurement signal, which is representative of the current exhaust gas pressure in the pressure chamber, by means of the said signal-determining circuit. Therefore, the pressure-detecting device can likewise be realized with a particularly simple construction. In this case, it is preferably provided that the respective signal-determining circuit is formed by an application-specific integrated semiconductor circuit (ASIC) in order to design the signal-determining device in a simple and effective manner.

As an alternative, only a single signal-determining circuit can be associated with the plurality of measuring circuits, it being possible to determine measurement signals, which are representative of the current exhaust gas pressure in the pressure chamber, by means of the said signal-determining circuit. A particularly compact construction of the pressure-detecting device can be realized in this way. In this case, it is preferably provided that this signal-determining circuit is likewise formed by an application-specific integrated semiconductor circuit (ASIC).

Further preferably, the pressure-detecting device has a signal-converting device, in particular a microcontroller, by means of which the measurement signals which are determined by the at least one signal-determining circuit can be converted to a defined signal standard. The measurement signals can be changed, for example, to the signal standard of an on-board electrical system of a vehicle by means of a signal-converting device of this kind. The converted measurement signal can then be transmitted to the controller and evaluated by the controller in a simple and effective manner. In this case, it is preferably provided that the converted measurement signals have an opposite pressure-dependent signal profile in order to simplify or further improve checking of the measurement signals by means of the controller in respect of their plausibility. For example, a signal of 0 volt to 5 volts can be output as a converted measurement signal in a pressure-dependent manner.

The pressure-detecting device may further include at least one temperature sensor, which is arranged in a defined region of proximity in the region of a measuring circuit, for measuring and/or estimating the temperature of the measuring circuit. A temperature-related measurement inaccuracy of the measuring circuit can be effectively counteracted by means of a temperature sensor of this kind. In this case, it is preferably provided that the temperature sensor is connected in a signal-transmitting manner to the at least one signal-determining circuit.

In yet a further embodiment, a pressure-detecting device, which comprises the measuring device, has a housing in which the measuring devices are arranged. Therefore, the measuring devices can be protected against external influences in a simple and effective manner. In this case, it is preferably provided that the at least one temperature sensor and/or the signal-converting device and/or the at least one signal-determining circuit are/is also arranged in the housing.

An actuating motor for adjusting the throttle position of the throttle element can also be arranged in the housing for the purpose of realizing a particularly compact construction.

The housing, together with the components which are arranged therein, further preferably forms a structural unit which can be fixed to the internal combustion engine, in particular to an exhaust gas line and/or to an actuator housing or actuating motor housing of the internal combustion engine. Therefore, the pressure-detecting device can be fitted to the internal combustion engine in a simple and effective manner. In this case, this structural unit can form a stand-alone sensor or can be designed as an integrated sensor unit for installation into or onto an additional housing, for example of an actuator. It is preferably provided that the housing has a fastening device by means of which the housing can be fastened to the exhaust gas line. In this case, the fastening device can be formed, for example, by a plurality of protruding tabs with continuous holes. When the housing is fastened to an exhaust gas line which is designed as a cast component, the exhaust gas line preferably has a flat contact face with which the housing can be brought into flat contact for the purpose of fastening to the exhaust gas line.

The housing preferably has at least one connection element, which forms an analogue or digital interface, for connecting the pressure-detecting device for signaling purposes to a controller and/or for connecting the pressure-detecting device to an electrical energy supply device. Therefore, the pressure-detecting device can be connected to the controller or to the energy supply device in a simple and effective manner. An analogue interface preferably has connections for supply voltage (U+), earth (Gnd), pressure signal 1 ($p_1$) and pressure signal 2 ($p_2$). A digital interface can be formed, for example, by a CAN, LIN or SENT bus.

For the purpose of achieving the abovementioned object, the disclosure is further directed to a method for operating an internal combustion engine, in particular as a drive engine for a vehicle, wherein the internal combustion engine has an engine braking device which has a throttle element which is associated with an exhaust gas section, in particular a throttle valve, for damming an exhaust gas which is emitted by a combustion device of the internal combustion engine, wherein the internal combustion engine has a measuring device by means of which exhaust gas pressure is measured in a defined measuring region of the exhaust gas section upstream of the throttle element as seen in the exhaust gas flow direction. According to the disclosure, at least one further measuring device is provided, by means of which the exhaust gas pressure is likewise measured at the defined measuring region, in particular for realizing a redundant exhaust gas pressure measurement. The measurement signals which are determined by means of the measuring devices are then transmitted to a controller, in particular to a controller for controlling the throttle element.

Furthermore, the disclosure is directed to a vehicle, in particular a utility vehicle, comprising the internal combustion engine according to the disclosure.

The advantages resulting from the procedure according to the disclosure and the vehicle according to the disclosure are identical to the advantages of the internal combustion engine according to the disclosure which have already been acknowledged, and therefore the said advantages do not need to be repeated at this point.

BRIEF DESCRIPTION OF THE DRAWINGS

The disclosure and the advantageous embodiments and/or developments thereof and also the advantages thereof will be explained merely by way of example in more detail below with reference to drawings
in which.

DETAILED DESCRIPTION

Figure 1:
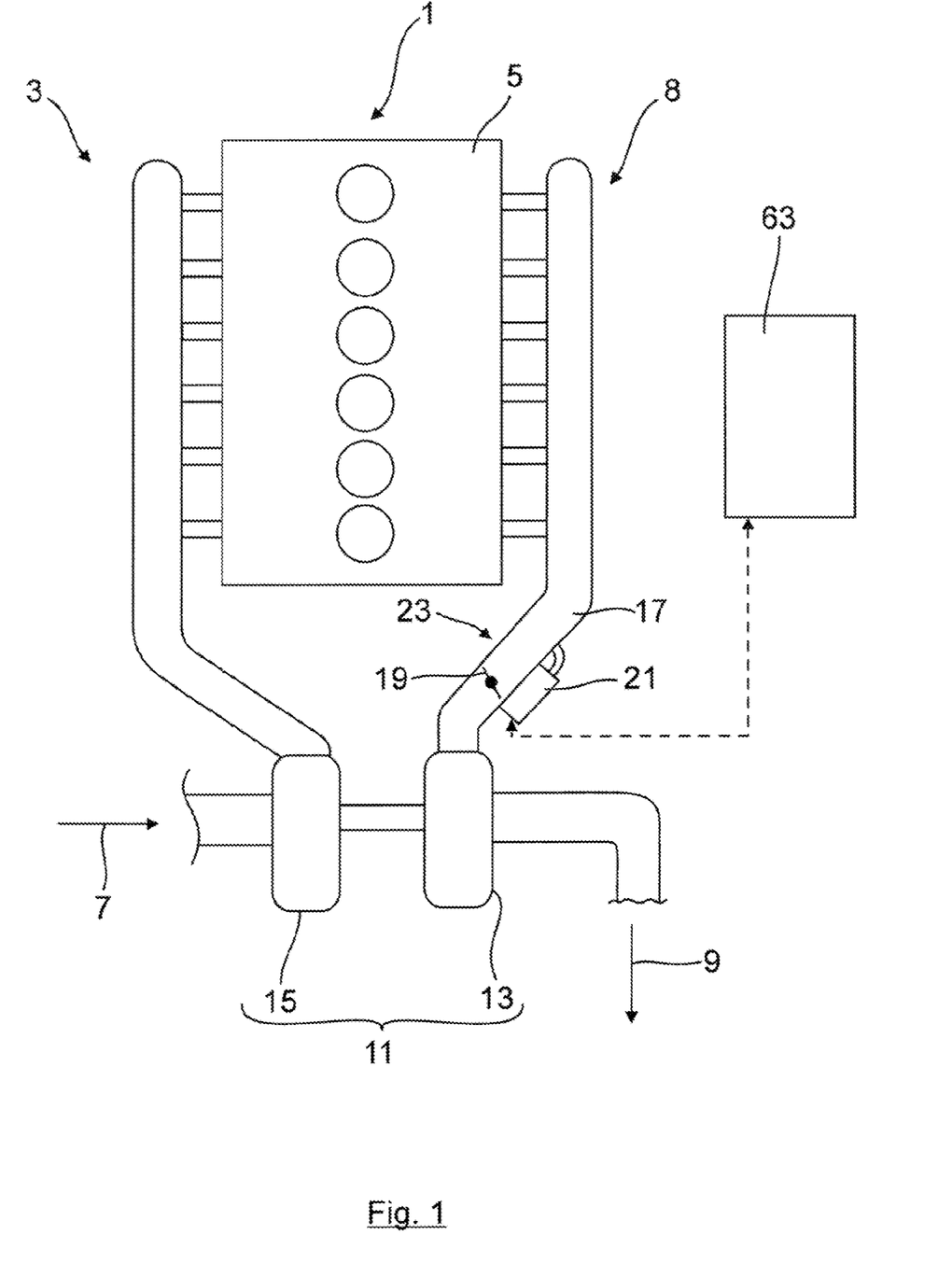
FIG. 1 shows a schematic illustration of an internal combustion engine according to the disclosure.

FIG. 1 schematically shows a portion of an internal combustion engine 1 according to the disclosure which can be formed, for example, by a six-cylinder diesel engine. The internal combustion engine 1 has an intake tract 3, partially shown here, by means of which combustion air 7 can be supplied to a combustion device 5 of the internal combustion engine 1. In addition, the internal combustion engine 1 also has an exhaust gas section 8, partially shown here, by means of which exhaust gas 9 which is emitted by the combustion device 5 is conducted into the free surrounding area. Furthermore, the internal combustion engine 1 also has, by way of example, an exhaust gas turbocharger 11 with an exhaust gas turbine 13 and an air compressor 15 here.

According to FIG. 1, the internal combustion engine 1 further also has a throttle element 19 which is arranged in an exhaust gas line 17 of the exhaust gas section 8, is formed, by way of example, by a throttle valve here, and by means of which the exhaust gas 9 which is emitted by the combustion unit 5 can be dammed. This throttle valve 19 is a constituent part of an engine braking device of the internal combustion engine 1 by means of which, for example, a vehicle which comprises the internal combustion engine 1 as a drive engine can be braked. In this case, the throttle valve 19 is arranged on or in the exhaust gas line 17 upstream of the exhaust gas turbine 13 as seen in the exhaust gas flow direction here.

Figure 2:
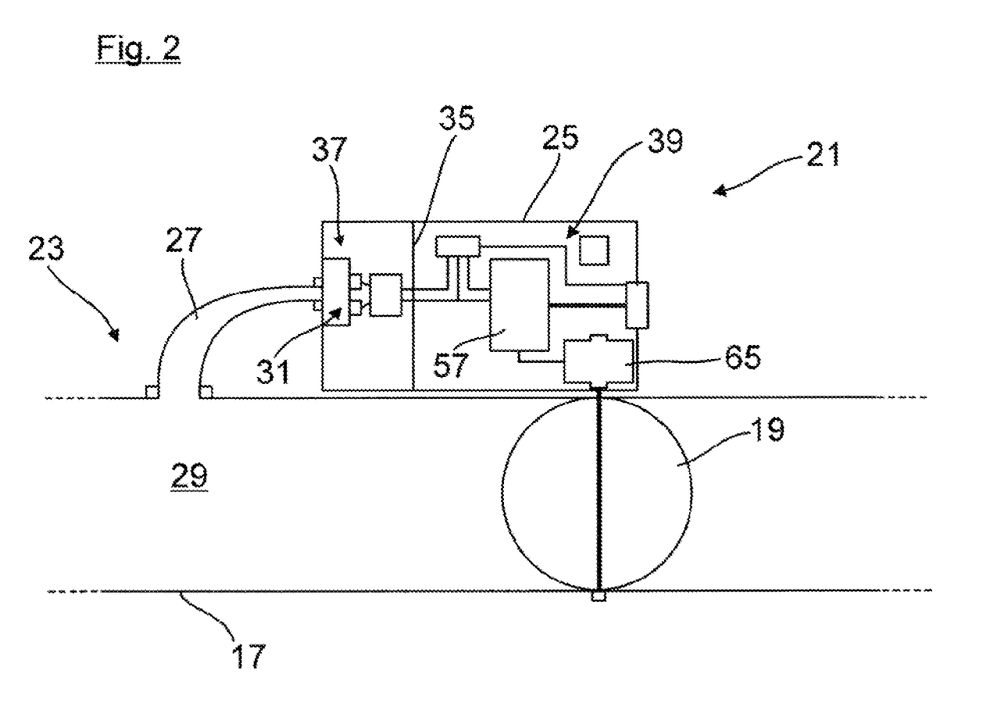
FIG. 2 shows a schematic illustration on the basis of which the construction of a pressure-detecting device of the internal combustion engine is explained in more detail.

Furthermore, FIG. 1 also shows a pressure-detecting device 21 of the internal combustion engine 1, by means of which pressure-detecting device the exhaust gas pressure can be measured at a defined measuring region 23 of the exhaust gas section 8 upstream of the throttle valve 19 as seen in the exhaust gas flow direction in the region of the throttle valve 19. The construction of this pressure-detecting device 21 will be explained in more detail below with reference to FIG. 2:

As is clear from FIG. 2, the pressure-detecting device 21 has a housing 25, which is in the form of a block or in the form of a box by way of example here, in which a plurality of components of the pressure-detecting device 21 are arranged. This housing 25 can be manufactured, for example, from steel. In addition, the pressure-detecting device 21 also has a connecting line 27 here, by means of which the exhaust gas line 17 is connected to the housing 25 of the pressure-detecting device 21. This connecting line 27 branches off from the exhaust gas line 17 of the exhaust gas section 8 at the defined measuring region 23 and protrudes, by way of example here, at a right angle from the exhaust gas line 17. In addition, the connecting line 27 is formed, by way of example here, by an L-shaped pipe section which tapers starting from the exhaust gas line 17 in the direction of the housing 25. In this case, the L-shaped pipe section 27 is connected, at its end regions, to the exhaust gas line or to the exhaust gas pipe 17 and to the housing 25 by means of welded connections here. As an alternative, the pipe section 27 could also be screwed into the exhaust gas pipe 17 or into the housing 25 or be connected to the exhaust gas pipe 17 and/or to the housing 25 by means of a clamping clip or a union nut.

Here, an interior chamber 29 of the exhaust gas line 17 is connected in a pressure-transmitting manner to a pressure chamber 31 of the housing 25 by means of the connecting line 27 in such a way that substantially only the hydrostatic exhaust gas pressure acts in the pressure chamber 31. Here, the housing 25, with the components which are arranged therein, forms, by way of example, a structural unit 33 which can be fixed to the exhaust gas line 17. To this end, the housing 25 has a fastening device, not shown in the figures, by means of which the housing 25 can be connected to the exhaust gas line 17. However, as an alternative, it would also be conceivable that the housing 25, with the components which are arranged therein, forms a structural unit together with the connecting line 27.

According to FIG. 2, the housing 25 also has a separating wall 35 by means of which a measuring chamber 37 of the housing 25 is separated from a signal-processing chamber 39 of the housing 25 here. As is clearer from FIG. 3, the measuring chamber 37 is additionally separated from the pressure chamber 31 of the housing 25 by means of further separating walls 41, 42 here. In this case, the separating walls 41 protrude inwards from an outer wall 43 of the housing 25 here and are connected to the separating wall 42 which runs parallel to the outer wall 43. In this case, the separating walls 41, 42 here form, together with the outer wall 43, the pressure chamber 31 which, by way of example, has a cross section of rectangular design here.

Figure 3:
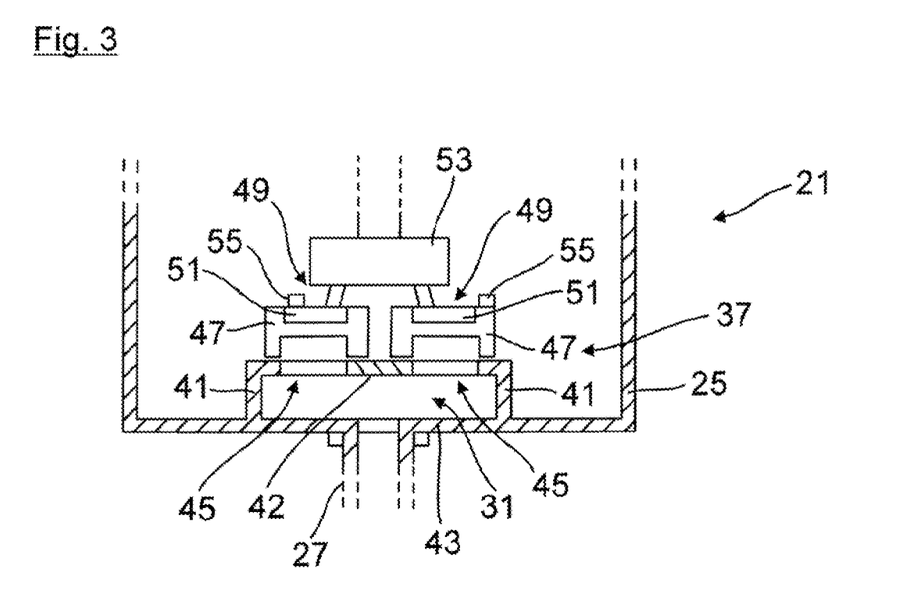
FIG. 3 shows a schematic sectional illustration of a portion of the pressure-detecting device.

As is further shown in FIG. 3, the separating wall 42 of the housing 25 has two continuous recesses 45 here. Here, each of these recesses 45 has an associated deformation element or an associated pressure cell 47 which are connected in a sealing manner to the separating wall 42 so that the deformation elements 47 likewise form or delimit the pressure chamber 31. Here, each of these deformation elements 47 forms a measuring device by means of which the exhaust gas pressure can be measured at the measuring region 23 of the exhaust gas line 17. A redundant exhaust gas pressure measurement is realized in this way. In this case, the deformation elements 47 can be fixed in a sealing manner to the separating wall 42 by means of adhesive connections for example.

Here, each deformation element 47 has, by way of example, a thin-walled deformation region 49 which, for the purpose of measuring the exhaust gas pressure, deforms depending on the exhaust gas pressure in the pressure chamber 31. An electrical measuring circuit 51 is mounted onto the deformation region 49 of the respective deformation element 47. Here, this electrical measuring circuit is formed, by way of example, by a resistive electrical circuit which changes its electrical resistance depending on the deformation of the deformation region 49.

Here, the plurality of electrical measuring circuits 51 are connected to a single signal-determining circuit 53 by means of which measurement signals which represent the current exhaust gas pressure in the pressure chamber 31 can be determined depending on the current electrical resistance of the respective resistive circuit 51. Here, this signal-determining circuit 53 is formed, by way of example, by an application-specific integrated semiconductor circuit (ASIC). Furthermore, each deformation element 47 also has an associated temperature sensor 55 here, by means of which the temperature of the respective electrical measuring circuit 51 is measured or estimated. These temperature sensors 55 are likewise connected in a signal-transmitting manner to the signal-determining circuit 53.

Figure 4:
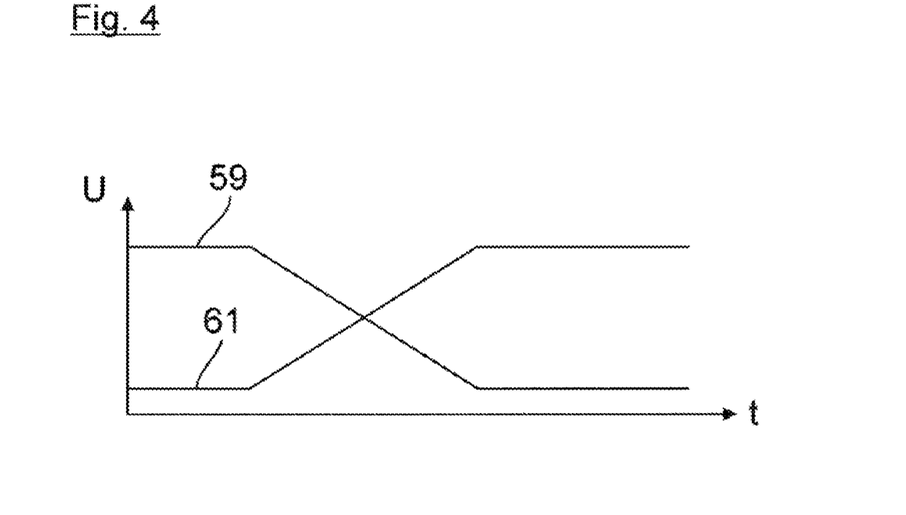
FIG. 4 shows a graph on the basis of which the manner of operation of the pressure-detecting device is explained in more detail.

As is further clear from FIG. 2, the deformation elements 47 and the signal-determining circuit 53 are located in the measurement chamber 37 of the housing 25. A signal-converting device 57 which is connected for signaling purposes to the signal-determining circuit 53 and by means of which the measurement signals which are determined by the signal-determining device 53 are converted to a defined signal standard is located in the signal-processing chamber 39 of the housing 25. This signal-converting device 57 can be formed, for example, by a microcontroller. Here, the measurement signals are converted, by way of example, in such a way that the converted measurement signals have an opposite pressure-dependent signal profile. An example of signal profiles of this kind is shown in FIG. 4. In this case, the converted measurement signal is formed by an electrical voltage signal U here. In this case, a curve 59 shows the time-dependent profile of a first converted measurement signal here. A curve 61 shows the time-dependent profile of a second converted measurement signal.

According to FIG. 2, the signal-converting device 57 is further connected here for signaling purposes to a CAN interface of the housing 25, by means of which CAN interface the signal-converting device 57 is connected in a signal transmitting manner to a controller 63 (FIG. 1) of the internal combustion engine 1. The controller 63 can be used to evaluate the measurement signals which are determined by means of the measuring device and control commands for driving an actuating motor 65 for adjusting the throttle position of the throttle valve 19 are determined by means of the controller 63. These control commands are transmitted to the microcontroller 57. The microcontroller 57 accordingly then actuates the actuating motor 65. According to FIG. 2, the actuating motor 65 is likewise arranged in the housing 25 of the pressure-detecting device 21 here.

Figure 5:
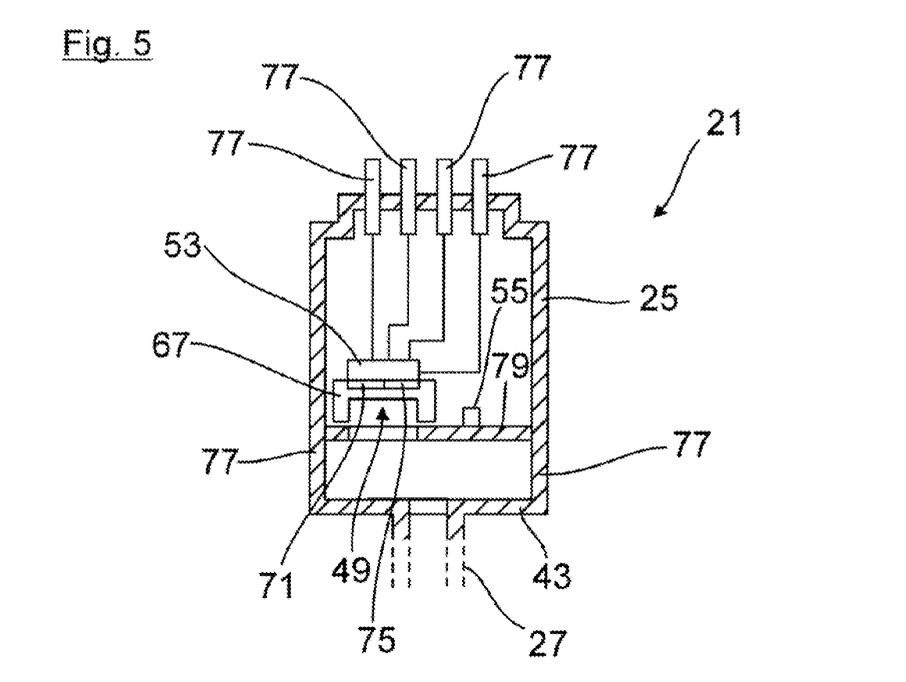
FIG. 5 shows a schematic sectional illustration of a second embodiment of the pressure-detecting device.

FIG. 5 shows a second embodiment of the pressure-detecting device 21. In comparison to the first embodiment shown in FIG. 2 and FIG. 3, only one single deformation element 67 which forms or delimits the pressure chamber 31 is provided here. In this case, a first electrical measuring circuit 71 is mounted on a first subregion of the deformation region 49 of the deformation element 67, while a second measuring circuit 75 is mounted on a second subregion of the deformation element 67. Here, each of these measuring circuits 71, 75 forms a measuring device for measuring the exhaust gas pressure. These measuring circuits 71, 75 are then, in turn, connected to the signal-determining circuit 53. Otherwise, no further components are arranged in the housing 25 here.

Furthermore, the signal-determining circuit 53 is connected directly to a plurality of connection elements 77 of the housing 25, which connection elements form analogue interfaces, here. In this case, one of these connection elements 77 forms the connection for a power supply here, a further connection element forms the connection for earth, and the two further connection elements form the output for the analogue measurement signals. In addition, the pressure chamber 31 is delimited by the outer walls 43, 77 and an inner separating wall 79 of the housing 25 here. In this case, the deformation element 67 is fixed to the inner separating wall 79.

Figure 6:
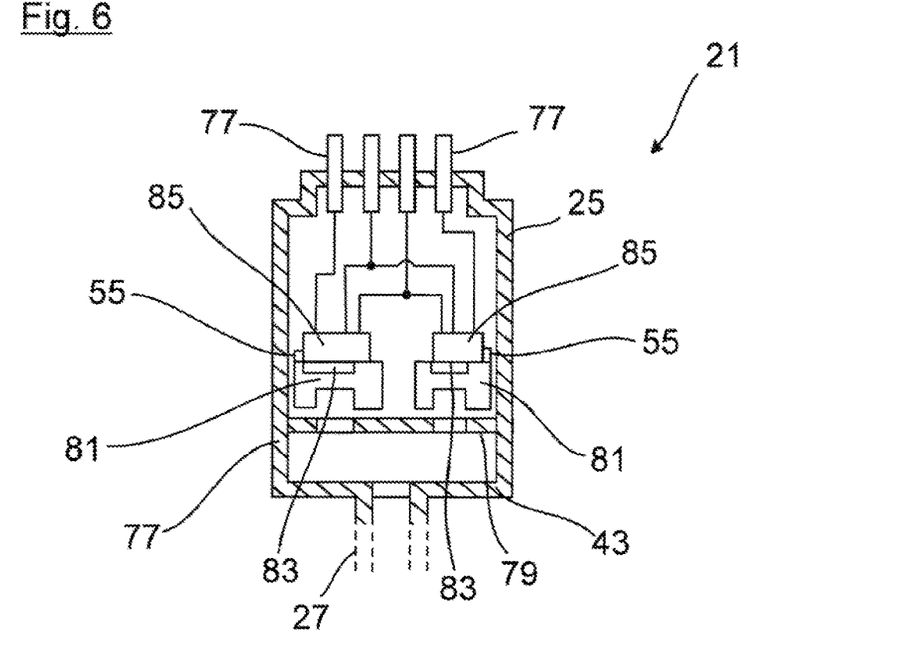
FIG. 6 shows, in an illustration according to FIG. 5, a third embodiment of the pressure-detecting device.

FIG. 6 shows a third embodiment of the pressure-detecting device 21. In comparison to the second embodiment shown in FIG. 5, two deformation elements 81, each of which has an electrical measuring circuit 83, are provided here. In addition, a signal-determining circuit 85 is also associated with each measuring circuit 83 here.

Figure 7:
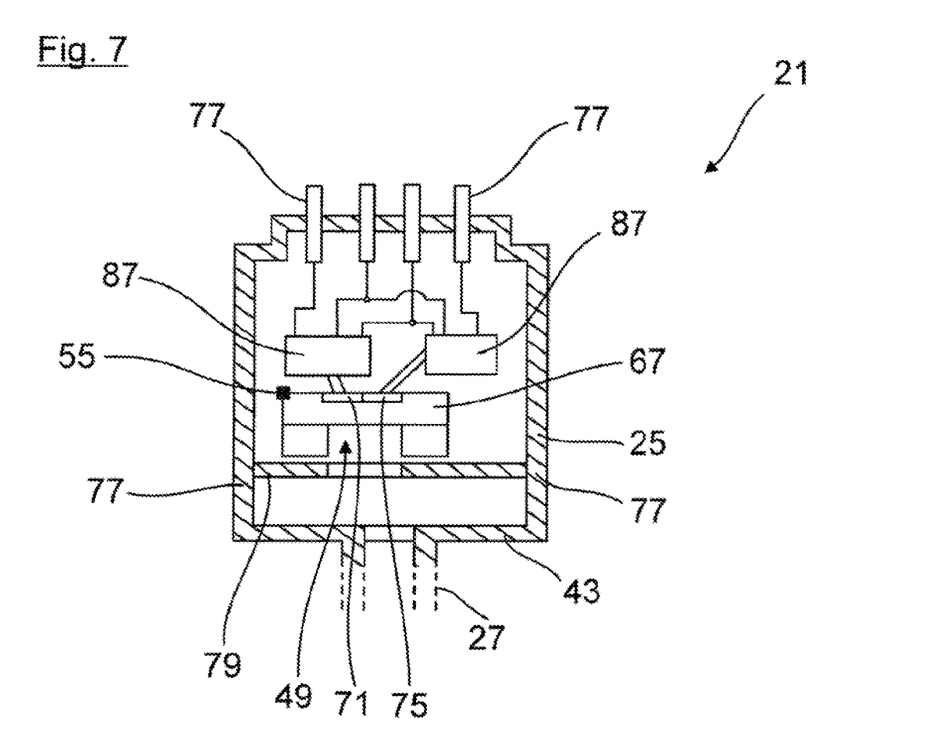
FIG. 7 shows, in an illustration according to FIG. 5, a fourth embodiment of the pressure-detecting device.

FIG. 7 shows a fourth embodiment of the pressure-detecting device 21. In comparison to the second embodiment shown in FIG. 5, a signal-determining circuit 87 is associated with each measuring circuit 71, 75 here.

LIST OF REFERENCE SYMBOLS

1 Internal combustion engine
3 Intake tract
5 Combustion device
7 Combustion air
8 Exhaust gas section
9 Exhaust gas
11 Exhaust gas turbocharger
13 Exhaust gas turbine
15 Air compressor
17 Exhaust gas line
19 Throttle valve
21 Pressure-detecting device
23 Measuring region
25 Housing
27 Connecting line
29 Interior chamber
31 Pressure chamber
33 Structural unit
35 Separating wall
37 Measuring chamber
39 Signal-processing chamber
41 Separating wall
42 Separating wall
43 Outer housing wall
45 Recess
47 Deformation element
49 Deformation region
51 Electrical measuring circuit
53 Signal-determining circuit
55 Temperature sensor
57 Signal-converting device
59 Curve
61 Curve
63 Controller 65 Actuating motor
67 Deformation element
71 First measuring circuit
75 Second measuring circuit
77 Outer wall
79 Inner separating wall
81 Deformation element
83 Measuring circuit
85 Signal-determining circuit
87 Signal-determining circuit

We claim:

1. An internal combustion engine, comprising:
an engine braking device, wherein the engine braking device has a throttle element which is associated with an exhaust gas section for damming an exhaust gas which is emitted by a combustion device;
a measuring device by means of which the exhaust gas pressure can be measured at a defined measuring region of the exhaust gas section upstream of the throttle element as seen in the exhaust gas flow direction;
at least one further measuring device, by means of which the exhaust gas pressure can likewise be measured at the defined measuring region, wherein the at least one further measuring device is usable for realizing a redundant exhaust gas pressure measurement, and in that the measurement signals which are determined by means of the measuring devices can be transmitted to a controller; and
a pressure-detecting device, which comprises the measuring devices, having a housing in which the measuring devices are arranged, wherein at least one temperature sensor is also arranged in the housing.

2. The internal combustion engine of claim 1, wherein the internal combustion engine is a drive engine for a vehicle.

3. The internal combustion engine of claim 1, wherein the throttle element is a throttle valve.

4. The internal combustion engine of claim 1, wherein the controller is a controller for controlling the throttle element.

5. The internal combustion engine of claim 1, further comprising a connecting line which branches off from an exhaust gas line of the exhaust gas section at the defined measuring region, an interior chamber of the exhaust gas line being connected in a pressure-transmitting manner by means of the said connecting line to a pressure chamber of the pressure-determining device which comprises the measuring devices, such that substantially only the hydrostatic exhaust gas pressure acts in the pressure chamber.

6. The internal combustion engine according to claim 1, wherein the pressure detecting device has at least one deformation element which delimits or forms a pressure chamber of the pressure-detecting device on the outside and is deformed in a pressure-dependent manner, where each measuring device has an electrical measuring circuit which is mounted onto a deformation element.

7. The internal combustion engine according to claim 6, wherein the respective electrical measuring circuit is formed by a resistive electrical circuit, or in that the respective electrical circuit is formed by a capacitive electrical circuit.

8. The internal combustion engine according to claim 6, wherein the pressure-detecting device has a single deformation element, and an electrical measuring circuit of a first measuring device is mounted on a subregion of the deformation element, and an electrical measuring circuit of a second measuring device is mounted on a further subregion of the deformation element.

9. The internal combustion engine according to claim 6, wherein the pressure-detecting device has a plurality of deformation elements, an electrical measuring circuit of a first measuring device is mounted onto a first deformation element, and an electrical measuring circuit of a second measuring device is mounted onto a second deformation element.

10. The internal combustion engine according to claim 6, further comprising a signal-determining circuit associated with each measuring circuit, capable of determining a measurement signal, which is representative of the current exhaust gas pressure in the pressure chamber, by means of the signal-determining circuit, wherein the respective signal-determining circuit is formed by an application-specific integrated semiconductor circuit (ASIC).

11. The internal combustion engine according to claim 6, further comprising a single signal-determining circuit associated with the plurality of measuring circuits, capable of determining measurement signals, which are representative of the current exhaust gas pressure in the pressure chamber by means of the said signal-determining circuit, wherein the signal-determining circuit is formed by an application-specific integrated semiconductor circuit (ASIC).

12. The internal combustion engine according to claim 10, wherein the pressure-detecting device has a signal-converting device by means of which the measurement signals which are determined by the signal-determining circuit can be changed or converted to a defined signal standard, wherein the converted measurement signals have an opposite pressure-dependent signal profile.

13. The internal combustion engine according to claim 6, wherein the pressure-detecting device has at least one temperature sensor, which is arranged in a defined region of proximity in the region of a measuring circuit, for measuring or estimating the temperature of the measuring circuit, wherein the temperature sensor is connected in a signal-transmitting manner to at least one signal-determining circuit.

14. The internal combustion engine according to claim 6, wherein the at least one deformation element is a diaphragm element or a pressure cell.

15. The internal combustion engine according to claim 1, wherein the at least one temperature sensor or a signal-converting device or at least one signal-determining circuit is also arranged in the housing.

16. The internal combustion engine according to claim 15, further comprising an actuating motor for adjusting the throttle position of the throttle element is also arranged in the housing.

17. The internal combustion engine according to claim 15, wherein the housing, together with the components which are arranged therein, forms a structural unit which can be fixed to the internal combustion engine wherein the housing has a fastening device by means of which the housing can be connected to the internal combustion engine.

18. A method for operating an internal combustion engine comprising:
providing an internal combustion engine having an engine braking device which has a throttle element associated with an exhaust gas section for damming an exhaust gas which is emitted by a combustion device of the internal combustion engine, wherein the internal combustion engine has a measuring device by means of which the exhaust gas pressure is measured at a defined measuring region of the exhaust gas section upstream of the throttle element as seen in the exhaust gas flow direction, wherein at least one further measuring device is provided, by means of which the exhaust gas pressure is likewise measured at the defined measuring region, for realizing a redundant exhaust gas pressure measurement, and in that the measurement signals which are determined by means of the measuring devices are transmitted to a controller, wherein the internal combustion engine further includes a pressure-detecting device, which comprises the measuring devices, having a housing in which the measuring device are arranged, wherein at least one temperature sensor is also arranged in the housing, wherein the internal combustion engine is a drive engine for a vehicle.

19. A vehicle comprising:

an internal combustion engine;

an engine braking device, wherein the engine braking device has a throttle element which is associated with an exhaust gas section for damming an exhaust gas which is emitted by a combustion device;

a measuring device by means of which the exhaust gas pressure can be measured at a defined measuring region of the exhaust gas section upstream of the throttle element as seen in the exhaust gas flow direction; and at least one further measuring device, by means of which the exhaust gas pressure can likewise be measured at the defined measuring region, wherein the at least one further measuring device is useable for realizing a redundant exhaust gas pressure measurement, and in that the measurement signals which are determined by means of the measuring devices can be transmitted to a controller; and a pressure-detecting device, which comprises the measuring devices, having a housing in which the measuring devices are arranged, wherein at least one temperature sensor is also arranged in the housing.

20. The vehicle of claim 19, wherein the vehicle is a utility vehicle.

\* \* \* \* \*